Aug. 2, 1960
L. E. POTTER
2,947,445
WORK PIECE TRANSFER MECHANISM
Filed May 26, 1958
2 Sheets-Sheet 1
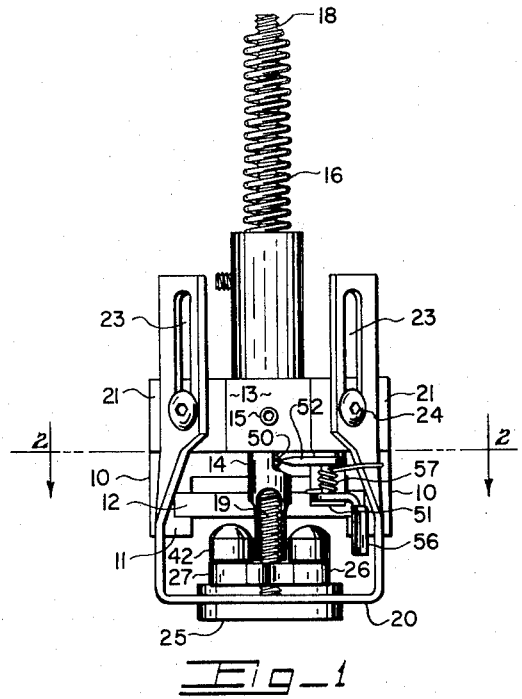
Fig_1
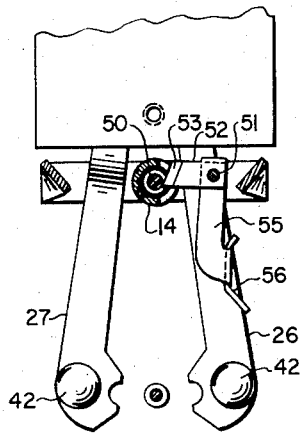
Fig_2
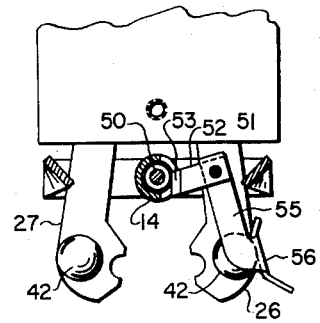
Fig_3
INVENTOR.
Linn E Potter
BY D. Emmett Thompson
Attorney INVENTOR.
Linn E. Potter
BY
L. Emmett Thompson
Attorney

United States Patent Office 2,947,445
Patented Aug. 2, 1960

2,947,445

WORK PIECE TRANSFER MECHANISM

Linn E. Potter, Fayetteville, N.Y., assignor to Syracuse Special Machine Co., Inc., a corporation of New York Filed May 26, 1958, Ser. No. 737,682

3 Claims. (Cl. 221—210)

This invention relates to a device, or apparatus, for transferring work pieces from a feeding station to a work station.

In the embodiment of the invention herein disclosed, the apparatus is employed for the transfer of threaded studs from a stud feeding station to a tool, in the nature of a stud driving chuck, by which the stud is threaded into an article, or part thereof. Stud transfer mechanisms of this type consist generally of vertically disposed tubular magazine through which the studs descend to a stop member. The lowermost stud is gripped by a pair of jaws and transferred laterally from the bottom of a magazine to the work station in register with a stud setting chuck which threads the stud into an article.

Immediately upon removal of the lowermost stud from the magazine, the stack of studs descend whereby the stud next to the lowermost stud becomes positioned upon the stud stop where it is engaged, or gripped, by the transfer jaws upon return movement from the stud setting chuck.

On occasion, due to the vibration of the machine and for other reasons, the stud positioned upon the stop becomes partially displaced so that it is not properly gripped by the transfer jaws, or becomes wholly displaced from the stop.

The object of this invention is a stud transfer mechanism embodying an arrangement for restraining the stack of studs in the magazine from descent upon removal of the lowermost stud from the magazine, the restraining means being removed, or disengaged, just prior to the return of the transfer jaws in registration with the stud magazine.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a front elevational view of a stud transfer mechanism embodying my invention.

Figure 2 is a view taken on line 2—2, Figure 1, showing in section the magazine and in plan the stud retaining member and stud transfer jaws, with the jaws advanced forwardly to the work station and having released the stud.

Figure 3 is a view similar to Figure 2, with the transfer jaws having moved rearwardly from the work station toward the magazine.

Figure 4:
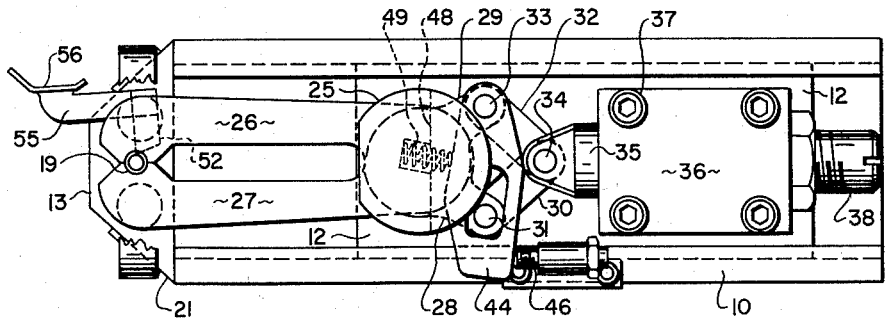
Figure 4 is a bottom plan view in which the transfer jaws are in gripping engagement with the lowermost stud in the magazine.

The apparatus consists of a frame 10 rectangular in general form and having depending side flanges 11, each provided on its inner surface with a groove. These grooves form guideways in which a plate 12 is slidably mounted in a direction lengthwise of the frame member 10.

A block 13 is secured to the forward end of the frame and is apertured to receive a tubular magazine 14 secured in place, as by set screw 15. A helical spring 16 extends upwardly from the magazine to a suitable hopper to guide the studs 18 downwardly through the magazine. The lowermost stud 19 rests upon a stop member 20 having end portions bent upwardly and overlying angular surfaces 21 formed on the front of the block 13. The upwardly extending end portions of the stop member 20 are formed with elongated slots 23 to receive fastening screws 24 extending therethrough and threaded into the block 13. With this arrangement, the stop member can be adjusted vertically toward and from the bottom of the magazine 14. The forward side of the lower portion of the magazine 14 is formed with a slot to provide an opening through which the lowermost stud 19 may be moved forwardly from the magazine.

Figure 5:
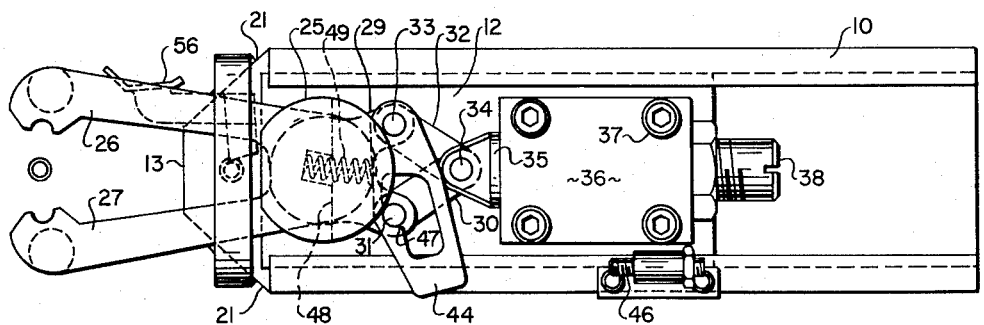
Figure 5 is a view, similar to Figure 4, with the carriage and transfer jaws moved forwardly to the position shown in Figure 2.

The plate 12 has affixed to its under side a pin, the enlarged head portion 25 of which is shown in Figures 1, 4 and 5. A pair of jaws 26, 27, are pivotally mounted scissor-fashion on this pin. The jaws have extensions 28, 29, respectively, extending rearwardly from the pivot pin. The rearward extension 28 is pivotally connected to a link 30 by a pin 31. The extension 29 is pivotally connected to a link 32 by a pin 33. The opposite ends of the links 30, 32, are pivotally connected by a pin 34 to a plunger 35 slidably mounted in a block 36 secured to the under surface of the plate 12, as by screws 37. There is a helical compression spring mounted in the bore of the block acting against the plunger 35 and an adjustable abutment 38 threaded into the rear end of the block. This spring serves to urge the plunger 35 forwardly and through the toggle formed by the links 30, 32, effect closing of the outer ends of the jaws 26, 27, onto the lowermost stud 19.

Figure 6:
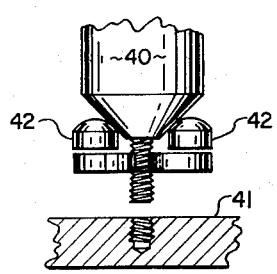
Figure 6 is a view illustrating the stud setting chuck.

The plate 12 acts as a carriage and when it is moved forwardly to the position shown in Figure 5, the stud is moved in registration with a stud setting chuck 40. As this chuck moves downwardly to engage and thread the stud into a work piece 41, Figure 6, the conical body of the chuck engages rollers 42, effecting separation of the jaws, as shown in Figures 2, 3 and 5. The jaws are maintained in this separated condition by a latch member 44, see Figures 4 and 5. This latch member is pivotally mounted at one end to the pivot pin 33, the opposite free end of the latch being positioned to engage an adjustable stop 46 fixedly secured to the frame member 10. The central portion of the latch member 44 is formed with a rectangular shaped aperture having a shoulder 47. The head 25 of the jaw pivot pin is formed with a slot on its rear side, the bottom of the slot being indicated by the dotted line 48, Figures 4 and 5, to receive the latch member 44 when it is moved in a clockwise direction by engagement with the abutment 46 when the carriage is moved to its rearward position, as shown in Figure 4. A spring 49 is positioned in the head 25 of the pivot pin to yieldingly urge the latch in a counter-clockwise direction.

When the carriage has been moved forwardly and the outer ends of the jaws separated by the stud driving chuck 40, the pivot pin 31 is moved inwardly past the shoulder 47 of the latch member, permitting the latch member to move in a counter-clockwise direction by action of the spring 49 whereupon the pin 31 becomes locked on the shoulder 47 and the jaws are thus latched in their separated position. The abutment 46 is positioned so that when the outer ends of the jaws are moved rearwardly in registration with the magazine 14, the latch 44 is moved in a clockwise direction out of engagement with the pin 34, permitting the spring in block 36, acting on the plunger 35, to close the jaws upon the lowermost stud.

An important feature of this invention resides in means for preventing the descent or dropping of the stud 50 positioned next above the lowermost stud 19 until the transfer jaws 26, 27, have been moved rearwardly from the tool 40 and are approaching a position in registration below the magazine 14. This means consists of a stud retaining member mounted upon a headed pin 51 secured to and depending from the under surface of the block 13. This retaining member has an arm portion 52 extending radially from the pin 51 and formed at its outer end with a knife edge 53 for engaging the threaded stud 50. The retaining member has a forwardly extending arm 55 terminating in a depending portion 56. A torsion spring 57 functions to move the retaining member in a clockwise direction, Figures 2 and 3, about the pin 51 to yieldingly maintain the knife edge 53 in engagement with the stud 50. In this position, the depending portion 56 is positioned to be engaged by the roller 42 on jaw 26 when the jaws are in separated position during their return or rearward movement. This engagement effects outward movement of the arm 55, effecting a counterclockwise movement of the arm 52 out of engagement with the stud 50, permitting it to drop upon the stop 20.

This arrangement prevents descent of the studs through the magazine while the transfer jaws are moving forwardly and during the major portion of their return movement, thus minimizing the possibility of the studs being disarranged, or displaced, until the transfer jaws are ready to engage and grip the lowermost stud.

What I claim is:

1. A work piece transfer apparatus for transferring a work piece from a feeding station to a tool spaced therefrom comprising a frame, a vertically disposed tubular magazine mounted on the frame for containing a supply of work pieces, a work piece stop positioned below the lower end of said magazine for supporting a stack of work pieces in the magazine, a carriage mounted in the frame for reciprocation forwardly and rearwardly thereof, a pair of jaws pivotally mounted at like ends on said carriage, means normally urging the free ends of said jaws together for gripping a work piece, means operable to spread said jaws apart and latch means for maintaining said jaws in spaced apart relation, means at said work feeding station for releasing said latch to permit closing of said jaws upon the lowermost work piece positioned on said stop, a work piece retaining member, means yieldably retaining said retaining member in engagement with the work piece next above said lowermost work piece to prevent descent thereof to said stop, said latched jaws being operable upon rearward movement of the carriage to move said work piece retaining member out of engagement with the work piece to permit descent thereof downwardly against said stop prior to the movement of said jaws to said feeding station.

2. A work piece transfer apparatus for transferring a work piece from a feeding station to a tool spaced therefrom comprising a frame, a vertically disposed tubular magazine mounted on the frame for containing a supply of work pieces, a work piece stop positioned below the lower end of said magazine for supporting a stack of work pieces in the magazine, a carriage mounted in the frame for reciprocation forwardly and rearwardly thereof, a pair of jaws pivotally mounted at like ends on said carriage, means normally urging the free ends of said jaws together for gripping a work piece, means operable to spread said jaws apart and latch means for maintaining said jaws in spaced apart relation, means at said work feeding station for releasing said latch to permit closing of said jaws upon the lowermost work piece positioned on said stop, a work piece retaining member, means yieldably retaining said retaining member in engagement with the work piece next above said lowermost work piece to prevent descent thereof to said stop, said retaining member having a portion positioned for contact by one of said latched jaws upon rearward movement of the carriage and being operable upon such contact to move said retaining member out of engagement with the work piece to permit descent thereof downwardly against said stop prior to the release of said latch.

3. A work piece transfer apparatus comprising a frame, a vertically disposed tubular magazine mounted on the frame for containing a stack of cylindrical work pieces, a work piece stop positioned below the lower end of said magazine for supporting said stack, a carriage mounted in the frame, a pair of work piece transfer jaws mounted on said carriage and extending forwardly thereof in a plane intermediate the lower end of said magazine and stop, the forward side of the lower end portion of said magazine being open to permit the lowermost work piece positioned on said stop to be moved forwardly from the magazine, said carriage being mounted for reciprocation to move said jaws into and out of registration with said magazine, means operable when said jaws are positioned in registration with said magazine to grip the lowermost work piece positioned on said stop for advancement of the work piece from said stop, a work piece retaining member mounted in juxtaposition to said magazine, means maintaining said retaining member in engagement with the work piece next above said lowermost work piece to prevent descent thereof to said stop, said jaws being operable during rearward movement of said carriage to move said work piece retaining member out of engagement with the work piece to permit descent thereof downwardly against said stop prior to the movement of said jaws in registration with said magazine.

References Cited in the file of this patent

UNITED STATES PATENTS

| | | |
|---|---|---|
| 776,893 | Davis | Dec. 6, 1904 |
| 2,497,899 | Monson | Feb. 21, 1950 |
| 2,668,596 | Jerum | Jan. 6, 1954 |